United States Patent [19]
Burns et al.

[11] Patent Number: 5,557,664
[45] Date of Patent: Sep. 17, 1996

[54] CALLING PARTY-PAID WIRELESS TELEPHONE SERVICE

[75] Inventors: Elaine G. Burns, Middletown; Esther L. Davenport, Holmdel; Belkacem Manseur, Tinton Falls; Gary A. Munson, Little Silver; Barry S. Seip, New Providence, all of N.J.; Elaine I. Sze, Kirkland, Wash.

[73] Assignee: AT&T, Holmdel, N.J.

[21] Appl. No.: 414,555

[22] Filed: Mar. 31, 1995

[51] Int. Cl.⁶ .................. H04M 15/00; H04M 15/06; H04M 17/00
[52] U.S. Cl. .................. 379/114; 379/111; 379/112; 379/113; 379/115; 379/127; 379/128; 379/142; 379/144
[58] Field of Search .................. 379/58–61, 111–115, 379/127, 128, 142, 144, 211

[56] References Cited

U.S. PATENT DOCUMENTS

| | | | |
|---|---|---|---|
| 5,109,405 | 4/1992 | Morganstein | 379/142 |
| 5,319,699 | 6/1994 | Kerihuel | 379/58 |
| 5,341,414 | 8/1994 | Popke | 379/142 |
| 5,452,350 | 8/1995 | Reynolds | 379/113 |

OTHER PUBLICATIONS

"Calling Party Pays" by Lloyd Covens, Cellular Marketing, vol. 6, No. 6, p. 33, Jun. 1991.
"Convincing Telcompany seen as key for calling Party Pays" Mobile Phone News, May 24, 1990, vol. 8, No. 11.
"McCaw Offers Calling Party Pays Feature", Businesswire, May 27, 1993.
"US West Cellular Introduces Calling Party Pays in Colorado", Businesswire, Jun. 6, 1994.

Primary Examiner—Wellington Chin
Assistant Examiner—Vijay Shankar
Attorney, Agent, or Firm—Gerald A. deBlase; Stephen M. Gurey

[57] ABSTRACT

A method is described for completing calls to wireless communications customers. A database is queried to determine whether to bill the calling party or the called party for communication charges (e.g., airtime charges) associated with the wireless communication service. When the query indicates that the calling party is to be billed for those communications charges, a telecommunications switch which received the call from the calling party is instructed to record information to be used in billing the calling party for the charges. At the same time, the wireless switch that normally would bill the called party for the charges is instructed to suppress billing of the called party for the charges. The billing instruction is sent to the wireless switch in a signaling message using a message parameter that is unaffected by intermediate (e.g., local exchange carrier) switches.

17 Claims, 2 Drawing Sheets

CALLING PARTY-PAID WIRELESS TELEPHONE SERVICE

TECHNICAL FIELD

This invention relates to wireless telecommunications and, more particularly, to methods for billing a calling party for the use by a called party of wireless telecommunications facilities.

BACKGROUND OF THE INVENTION

Calls placed over wireless telecommunications facilities often involve charges incurred by both the calling party and the called party. The calling party incurs conventional telecommunications charges (e.g., toll charges) associated with the call, as well as so-called "airtime" charges when the calling party originates the call over wireless communications facilities (e.g., a cellular telephone). The called party also will incur airtime charges when using wireless communications facilities, even though the called party did not originate the call. These airtime charges lead people with wireless communications devices to turn off their equipment to avoid paying charges for unwanted calls. Also, prospective callers may feel inhibited to call a wireless telephone number, knowing that the called party will also be charged for the call. This reduces the utility of having the wireless communications device in the first place.

One way to increase the use of wireless telecommunications facilities is to provide a mechanism for billing the calling party for charges associated with the called party's use of the wireless facilities. However, there are several problems associated with such a billing arrangement. For example, the communications system must provide a mechanism for billing the calling party for airtime instead of billing the called party. It is possible to allow normal billing to occur and to change the billing during a billing cycle using "back-end record matching." However, this process would require expensive modifications to cellular billing systems and is prone to error and fraud.

SUMMARY OF THE INVENTION

Increased flexibility is provided to wireless communications customers, in accordance with the invention, by querying a database to determine, on a call-by-call basis, whether to bill the calling party or the called party for communication charges (e.g., airtime charges) associated with wireless communication service. Using a call-by-call approach to determine the party to be billed advantageously permits the called party to "schedule" when the called party will be asked to pay for airtime charges. When the query to the database indicates that the calling party is to be billed for those communications charges, a telecommunications switch which received the call from the calling party is instructed to record information to be used in billing the calling party for the charges. At the same time, the wireless switch that normally would bill the called party for the charges is instructed to suppress billing of the called party for the charges, by including within the signaling messaging an indication that the calling party is to pay for airtime charges.

In an exemplary embodiment of the invention, calls placed to a special, non-geographic telephone number associated with a cellular telephone subscriber are processed by a special processor to determine calling handling and routing. The processor uses the dialed telephone number to retrieve a record which specifies the services and features to which the called party has subscribed. If the called party has subscribed to the calling party pays airtime service feature, as indicated by the contents of the subscriber's record, the processor causes an announcement regarding the pricing of the call to be played to the calling party. When the calling party agrees to pay for the airtime charges, the processor signals a wireless switch with the telephone number of the wireless telephone to which the call is to be completed, as well as with the dialed number. The dialed telephone number serves as an indication that the wireless switch is to inhibit billing the called party for airtime charges.

DETAILED DESCRIPTION

Figure 1:
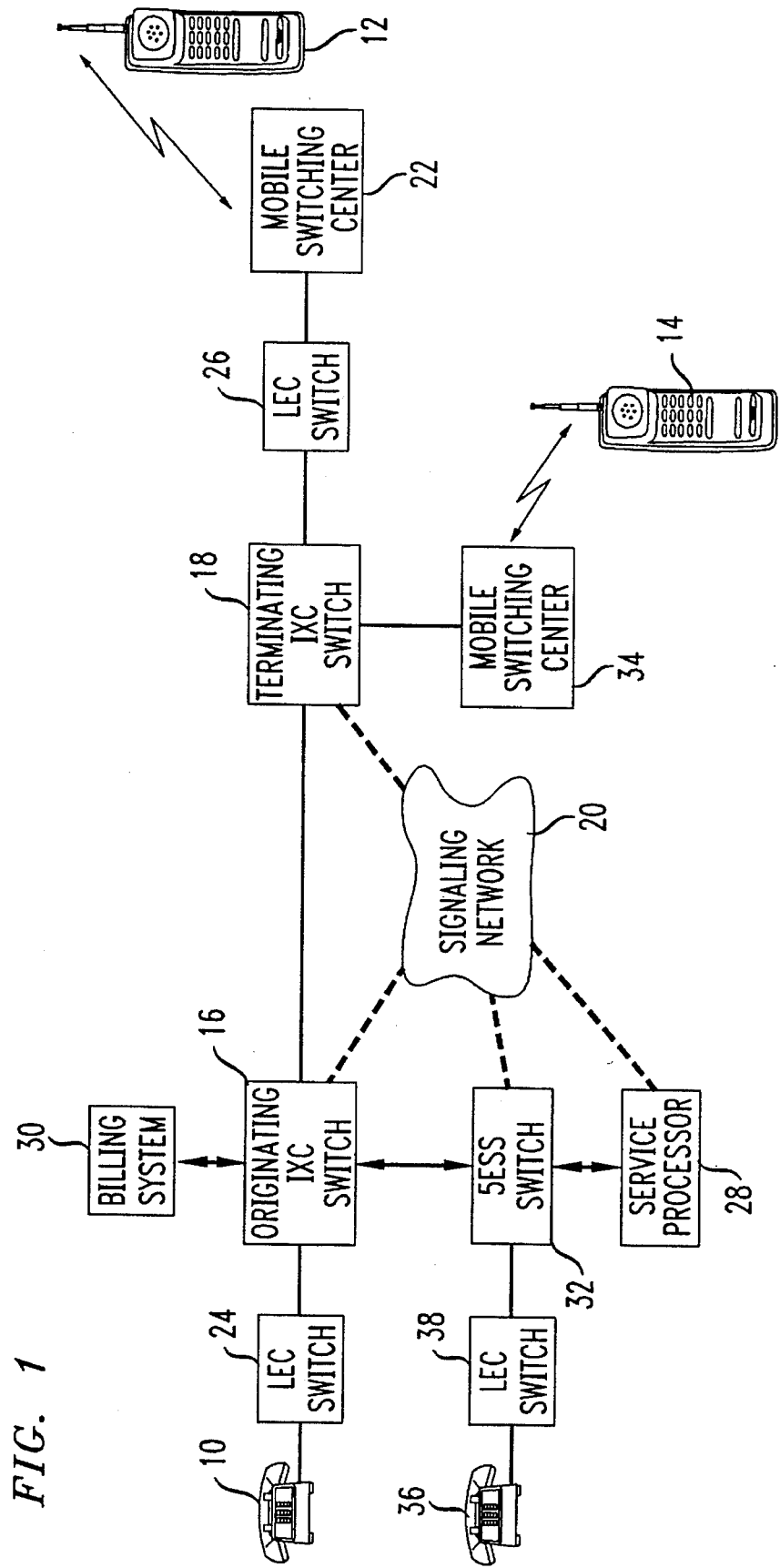
FIG. 1 is a simplified block diagram of a system for completing calls in accordance with the principles of the present invention.

FIG. 1 shows a network for completing telephone calls to wireless telephone facilities in accordance with the principles of the invention. More particularly, calls placed by a calling party from a telephone station set 10 are completed to a wireless telephone 12 through a network which includes an originating interexchange carrier (IXC) switch 16, a terminating IXC switch 18, a signaling network 20, and a mobile switching center 22. The network also may include one or more local exchange carrier switches 24 and 26. A service processor 28 processes information in accordance with the invention to determine, among other things, whether to bill the calling party or the called party for charges associated with the called party's use of wireless communication facilities (e.g., mobile switching center 22). An intermediate switch 32 optionally connects service processor 28 with originating IXC switch 16. On the basis of the determination made by service processor 28, originating IXC switch 16 may provide data to a billing system 30 for billing the calling party for charges associated with the called party's use of mobile switching center 22. Billing system 30 is a conventional billing system which generates industry standard AMA billing records.

Of course, various modifications can be made to the network without departing from the scope of the invention. For example, telephone station 10 could be directly connected to originating IXC switch 16. Similarly, a mobile switching center, such as mobile switching center 34, could be directly connected to terminating IXC switch 18 for completing calls to a wireless telephone 14.

In the embodiment of FIG. 1, IXC switches 16 and 18 illustratively are 4ESS® switches commercially available from AT&T Corp. LEC switches 24 and 26 and intermediate switch 32 illustratively are implemented as 5ESS™ switches also commercially available from AT&T Corp. Service processor 28 may be implemented using a 2NCP processor available from AT&T Corp., but could be any processor means capable of utilizing TCAP SS7 messages and having the additional capability described below. Mobile switching centers 22 and 34 may be any commercially available wireless switch capable of supporting ISUP signaling.

Signaling network 20 interconnects the various components of the network. The signaling network illustratively is the Common Channel Signaling System No. 7 (SS7), and includes various components, well known to those skilled in the art, which need not be described here. It is unclear at present whether the architecture of future wireless systems will provide direct signaling connections between the facilities of wireless service providers (e.g., mobile switching center 22) and other network components (e.g., IXC switch 16). As described below, one feature of the invention involves using signaling messages in a novel manner to provide a mechanism for billing a calling party for airtime charges, even where the wireless service facilities are not directly connected by signaling system 20 to other switches involved in handling a particular call.

Figure 2:
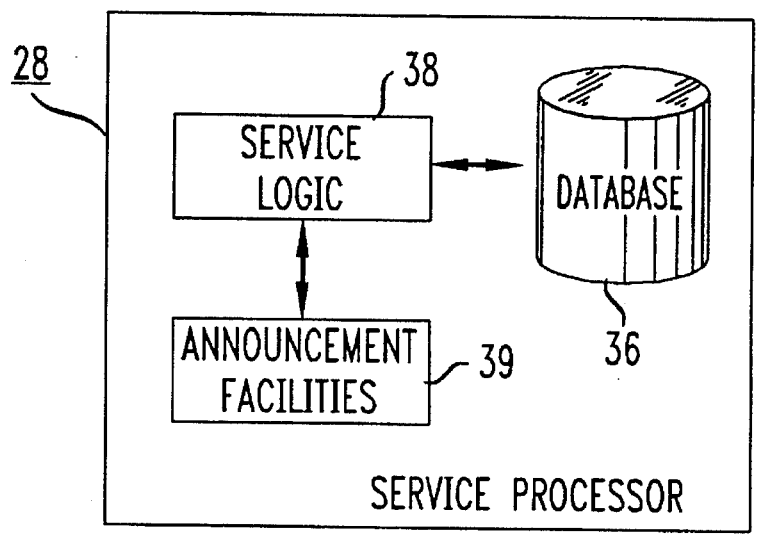
FIG. 2 is a simplified block diagram of the service processor of FIG. 1.

FIG. 2 shows service processor 28 in greater detail. Service processor 28 includes a database 36, service logic 38 for processing calls, and announcement facilities 39 for causing announcements to be played or causing dual tone multifrequency (DTMF) digits to be collected. Database 36 stores records (described below and shown in FIG. 3) which include information about services provisioned for certain customers of the communication network. In particular, database 36 stores information about whether particular customers subscribe to a service feature (referred to hereafter as the "calling party pays airtime" or "CPPA" feature) in which the calling party pays for the charges incurred for the called party's use of wireless transmission facilities. Service logic 38 represents the conventional processing equipment and software needed to store, retrieve, and process records in database 36, and to communicate with switch 32 and signaling network 20. Announcement facilities 39 may be the equipment actually used to play announcements, or may be facilities for using signaling, such as SS7 signaling, to cause originating IXC switch 16 to play a desired announcement to a calling party at telephone station 10.

Call processing proceeds as follows. A caller at telephone station 10 dials a telephone number of a called party (hereafter also referred to as a "subscriber") who subscribes to the calling party pays airtime service feature. The call is extended from telephone station 10 to LEC switch 24 and is switched to originating IXC switch 16. Switch 16 communicates the dialed telephone number to service processor 28, using TCAP messaging of SS7 signaling. The dialed telephone number preferably is a special, non-geographic telephone number, such as a number of the form 500-xxx-xxx. The non-geographic telephone number directs the call to a network or service provider that has implemented the calling party pays airtime feature, and indicates that the call should be processed by service processor 28 to determine call routing and handling. Stated more generally, the non-geographic telephone number causes a switch to query a database to determine how to route the call and what features are available to the subscriber. Of course, one skilled in the art will appreciate that all calls directed to wireless telephone facilities could automatically be routed to service processor 28, for example, by recognizing the telephone number as a MIN on the basis of the dialed digits and routing to the service processor.

Service processor 28 uses the dialed telephone number to retrieve a record (FIG. 3) which specifies the telephone number to which the call is to be routed, and the services and features to which the called party has subscribed. The calling party pays airtime feature is offered to subscribers as one possible feature associated with a special service or non-geographic telephone number. If the called party has subscribed to the calling party pays airtime service feature, service processor 28 causes an announcement regarding the pricing of the call to be played to the calling party. In particular, service processor 28 sends an SS7 TCAP message to originating IXC switch 16 to activate switch-based announcement capability to play a predetermined announcement (or generates the announcement using announcement facilities 39). For example, switch 16 may play an announcement such as:

> Your call has been placed to a wireless telephone. If you wish to complete this call, you will be charged an additional 45 cents per minute to cover the cost of the airtime charges associated with the call. If you do not wish to pay the airtime surcharge, please hang up now.

If the caller refuses to accept the charges for airtime, the caller simply "hangs up" the telephone so as to disconnect the call. In this instance, switch 16 "tears down" the call in a conventional manner. However, if the caller accepts the charges for airtime, service processor 28 instructs switch 16 to record billing information to be used by billing system 30 to bill the caller at telephone station 10 for the airtime charges that otherwise would have been assessed to the wireless customer at telephone station 12. Service processor 28 signals switch 16 with the telephone number or mobile identification number ("MIN") to which the call will be completed (e.g., the MIN of telephone 12). As described below, service processor 28 also signals mobile switching center 22 to inhibit switching center 22 from billing airtime for the call.

Typically, when a cellular call is placed to a non-geographic telephone number which later is translated to a MIN, only the MIN is sent to the wireless switch (e.g., mobile switching center 22). The dialed number (e.g., the dialed 500 number) is not forwarded to the wireless switch. In a departure from the prior art, the dialed number (or some other suitable indicator) is sent to the wireless switch, together with the MIN, as a mechanism for indicating to the wireless switch that billing for airtime is to be inhibited. To achieve this result, the dialed number or indicator must be passed to the wireless switch without interference from or modification by intermediate switches in the call path, such as the LEC switches. By placing the dialed number or other indicator in a signaling message—in a field or parameter not tampered with by the intermediate switches—calling party pays airtime can be implemented even when the wireless switch is not directly to the signaling network of the interexchange carrier. Furthermore, the wireless service provider knows that the called party must pay for airtime when the indicator is not present.

In an exemplary embodiment of the invention, originating IXC switch 16 sends the dialed number (or indicator) to Mobile Switching Center 22 in the Generic Address parameter (GAP) of the ISUP Initial Address Message (IAM) which is sent via the signaling network to terminating IXC switch 18. Originating IXC switch 16 populates the GAP parameter using the Called Party Number message contents delivered from LEC switch 24. Switch 18 passes the contents of the GAP parameter on Network Interconnect to LEC switch 26 (or directly to the wireless switch in the case of mobile switching center 34). LEC switch 26 passes the contents of the GAP parameter on to mobile switching center 22 via ISUP signaling. When the mobile switching center receives the dialed number in the GAP parameter, billing of the called party for airtime charges is suppressed. This may be accomplished, for example, by suppressing recording for airtime charges at the mobile switching center, or by rendering the record generated at the mobile switching center unbillable. The wireless service provider (mobile switching center 22) maintains a listing of customers having the calling party pays airtime feature and their associated non-geographic telephone numbers (e.g., 500 numbers) so that mobile switching center 34 knows to suppress billing when the dialed number is received. When the invention is implemented by providing an indicator in the GAP parameter instead of the non-geographic telephone number, the wireless switch may be configured to recognize the indicator directly as indicating calling party pays airtime, so as to eliminate the need to maintain the table of non-geographic telephone numbers.

When a calling party agrees to pay the airtime surcharge that typically would have been paid by the called party, service processor 28 signals to originating IXC switch 16 to mark the AMA record as a "CPPA" record. This special designation, or some other suitable indication, is used to indicate that a premium rate is to be applied for this call. The billing record is then rated and processed in a conventional manner.

Figure 3:
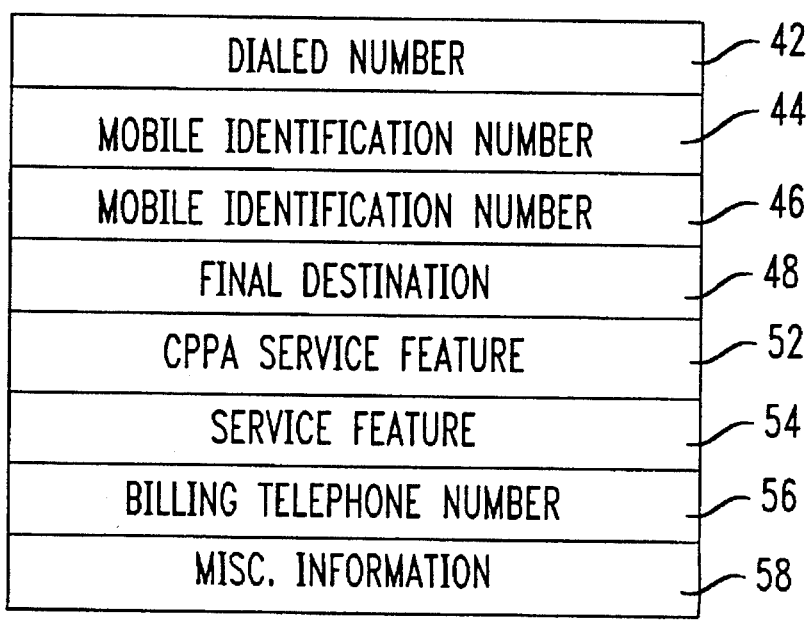
FIG. 3 shows an exemplary record suitable for use in implementing the calling party pays airtime feature of the present invention.

FIG. 3 shows an illustrative record 40 useful for implementing service in accordance with the principles of the invention. Record 40 includes a "dialed number" field 42, one or more "mobile identification number" (MIN) fields 44 and 46, a "final destination" field 48, "service feature" fields 52 and 54, a "billing telephone number" field 56, and one or more fields 58 for storing additional miscellaneous information. Dialed number field 42 stores the subscriber's special service telephone number. Service logic 38 of service processor 28 (FIG. 2) compares the telephone number dialed by the caller with the contents of dialed number field 42 so that the appropriate record can be retrieved from database 36. MIN fields 44 and 46 store the telephone numbers of the subscriber's wireless telephones. For those subscribers who subscribe to a "call sequencing" service feature, in which the communications network attempts sequentially to complete the call to the telephone numbers in record 40 (fields 44 and 46), final destination field 48 stores the "final destination" to which the call will be completed (e.g., to voice messaging) when all other attempts to complete the call have been unsuccessful. "CPPA" field 52 and service feature field 54 store codes, flags, or other indicators which identify those service features available to the subscriber. CPPA field 52 stores an indication of whether the service feature is active or inactive (i.e., in an active state or in an inactive state) at a particular time. The billing telephone number field 56 stores the telephone number to be billed when charges are incurred for the telephone number stored in field 42. Of course, while these data fields may be useful for certain applications, record 40 could include additional or fewer fields, as necessary. For example, record 40 may include a single MIN field 44 and a field, in lieu of field 46, which holds a telephone number associated with a conventional (non-wireless) telephone.

The call-by-call approach of determining whether to bill the calling the party for airtime charges advantageously enables the called party to "schedule" when the calling party pays airtime feature will be in effect. This scheduling capability can be implemented, for example, either by (1) storing the subscriber's selection of whether the feature is active or inactive and using this selection until a subsequent selection is made by the subscriber; or (2) maintaining a daily or weekly calendar of when the feature is in effect for the subscriber. To implement the first embodiment, service processor 28, under the control of a program stored in service logic 38, effects changes in the information stored within field 52 of record 40 to register whether the calling party pays airtime feature is in effect. A subscriber to the calling party pays airtime feature uses an audio interface to provide instructions to service processor 28 to selectively turn the feature on or off. For example, the subscriber may access a service platform by dialing a toll-free telephone number to obtain access to a menu, and through the use DTMF signals or speech recognition commands, make a desired selection. To implement the calendar, the subscriber specifies a time band (e.g., 9 A.M. to 5 P.M.) and optionally a day of the week, and then specifies whether the calling party pays airtime feature is in effect for the specified period.

The call-by-call approach of determining whether to bill the calling the party for airtime charges also enables the called party to selectively apply the calling party-paid airtime service on the basis of the identity of the calling party. For example, a subscriber may specify one or more personal identification numbers, or "PINs," and specify the calling party-paid airtime service is either active or inactive when a caller enters one of the specified PINs. The list of PINs specified by the subscriber may be stored, for example, in miscellaneous information field 58 of record 40. Service processor 28 would prompt the caller to enter a PIN, and then compare the caller-provided PIN with the PINs in record 40 to determine the call treatment to be used for processing a particular call. Similarly, the subscriber could store (in record 40) one or more automatic number identifiers ("ANIs") which identify the telephone station from which a caller is calling, together with an indication for each ANI as to whether the calling party-paid airtime service is either active or inactive. PINs and ANIs could be used separately or in combination.

Having described an exemplary call flow in the context of a direct dial or so-called "1+" call, the invention will now be described in the context of an operator services or "0+" call. Referring again to FIG. 1, switch 32 preferably is equipped with operator services positioning system (OSPS) capability to allow the switch to process operator assistance calls (such as calling card calls) from telephone station set 36. A calling party at telephone station 36 places a call to a wireless telephone service customer at wireless telephone set 12 through an operator services position associated with switch 32. The call is extended from telephone 36 to LEC switch 38, which in turn routes the call to the OSPS of switch 32. LEC switch 38 routes the call using modified operator services signaling (MOSS) to provide the dialed number and the ANI to switch 32. Switch 32 communicates with service processor 28, illustratively using a T1 call processing data link (e.g., a BRI or PRI interface) with the operator service position. If the destination number has the CPPA feature and the called party has chosen to accept only calls for which the calling party will pay the airtime, service processor 28 will cause an announcement regarding the pricing of the call to be played to the calling party. If the caller chooses to pay the called party airtime charges and complete the call, service processor 28 signals switch 32 to mark the AMA billing record created for the call as a "CPPA" record so that a premium rate can be applied when billing for the call. Switch 32 passes the dialed number in the GAP parameter of the ISUP IAM to IXC switch 16. IXC switch 16 passes the dialed number in the GAP parameter of the ISUP IAM across the network to terminating IXC switch 18. Terminating IXC switch 18 maps the contents of the dialed number parameter to the GAP parameter on Network Interconnect to LEC switch 26. LEC switch 26 passes the contents of the GAP parameter to mobile switching center 22. When mobile switching center 22 receives the dialed number in the GAP parameter, recording at mobile switching center 22 for airtime charges is suppressed, or the billing record is rendered unbillable.

One skilled in the art will appreciate that various modifications can be made without departing from the scope of the invention. For example, although the invention has been described in the context of maintaining a subscriber record for each subscriber, service processor 28 may alternatively receive the dialed number and perform a "look up" in a table stored in database 36 on the basis of the dialed number. Such a table could include only two fields, namely, a "dialed number" field and a "calling party pays airtime" indicator field. Service processor 28 uses the dialed number as a pointer to a location on the table to find the service feature status in the indicator field. The status of the indicator could be, for example, "active," indicating that the calling party is to pay for the called party's airtime charges, or "inactive," indicating that the called party will pay the airtime charges. When the indicator is active, service processor 28 causes IXC switch 16 to include an indication in the GAP parameter of the signaling message (described above) to mobile switching center 34 that the calling party pays airtime feature is in effect for the call.

The invention claimed is:

1. A method for processing a call from a calling party to a called party, the method comprising the steps of:

responsive to a dialed telephone number, querying a database to determine on a call-by-call basis whether to bill the calling party or the called party for communication charges associated with wireless communications service provided to the called party, the dialed number being a number associated with a provider to the called party which provides a service in which the called party can designate that the calling party is to be billed for the communication charges;

delivering to a wireless telecommunications switch a routing telephone number obtained from the database query, the routing telephone number identifying a telephone station to which the call is to be completed and being different from the dialed telephone number; and responsive to a determination in the querying step that the calling party is to be billed for the communication charges, inhibiting billing of the called party for the communication charges.

2. The method of claim 1 wherein the communication charges are airtime charges associated with the called party's use of wireless telecommunications facilities.

3. The method of claim 1 wherein the step of inhibiting billing of the called party comprises rendering unbillable a billing record generated for the call.

4. The method of claim 1 further comprising the step of billing the calling party for the communications charges.

5. The method of claim 1 further comprising the step of announcing billing information to the calling party.

6. The method of claim 1 further comprising the step of collecting information from the calling party which indicates whether the calling party will accept billing for the call.

7. A method for providing wireless telecommunications service on calls to a called party, the method comprising the steps of:

storing in a database information specifying whether a calling party-paid wireless communication service, in which a calling party is billed for communication charges associated with a call is in an active state or in an inactive state for the called party;

querying the database on a call-by-call basis to determine whether to bill the calling party or the called party for communication charges associated with wireless communications services provided to the called party, said querying step being in response to a telephone number dialed by a calling party that is associated with a provider that provides the calling party-paid wireless communication service to the called party;

responsive to a determination in the querying step that the calling party is to be billed for the communication charges, inhibiting billing of the called party for the communication charges.

8. The method of claim 7 further comprising the step of:

responsive to a determination in the querying step that the calling party is to be billed for the communication charges, causing a telecommunications switch to record information to be used in billing the calling party for the communication charges.

9. The method of claim 7 wherein the information comprises:

an identification of at least two different time periods; and for each of said at least two different time periods, an indication of whether the calling party-paid wireless communications service is in an active state or in an inactive state for the entitled customer.

10. The method of claim 7 wherein the communication charges are airtime charges associated with the called party's use of wireless telecommunications facilities.

11. The method of claim 7 further comprising the step of responding to a selection by the entitled customer to change the active/inactive state of the calling party-paid wireless communication service.

12. The method of claim 7 wherein the information comprises:

at least one caller identifier; and an indication, associated with the at least one caller identifier, of whether the calling party-paid wireless communications service is in an active state or in an inactive state for the entitled customer.

13. The method of claim 12 wherein the caller identifier comprises a personal identification number.

14. The method of claim 12 wherein the caller identifier comprises an automatic number identifier.

15. A method for processing a call from a calling party to a called party, the method comprising the steps of:

querying a database to determine on a call-by-call basis whether to bill the calling party or the called party for communication charges associated with wireless communications service provided to the called party; and responsive to a determination in the querying step that the calling party is to be billed for the communication charges, transmitting to a wireless telecommunications switch (1) a telephone number of a wireless telephone to which the call is to be completed, and (2) a telephone number dialed by the party, the dialed telephone number being a number associated with a provider to the called party which provides a service in which the called party can designate that the calling party is to be billed for the communication charges and indicating to the wireless switch to inhibit billing of the called party for the communication charges.

16. The method of claim 15 wherein the dialed telephone number is a non-geographic telephone number.

17. The method of claim 15 wherein the communications charges are airtime charges associated with the called party's use of wireless telecommunications facilities.

\* \* \* \* \*